May 8, 1962  E. J. GOLDMAN  3,033,227
BALL VALVE
Filed March 25, 1960

*INVENTOR.*
EDWARD J. GOLDMAN
BY
Dike, Thompson & Bronstein
ATTORNEYS

3,033,227
BALL VALVE
Edward Joseph Goldman, Milton, Mass., assignor to Walworth Company, New York, N.Y., a corporation of Massachusetts
Filed Mar. 25, 1960, Ser. No. 17,595
1 Claim. (Cl. 137—328)

The present invention relates to a soft-seat ball valve capable of being adjusted with respect to the seating of the ball on its seat or seats without disturbing its connection in the line in which it is installed.

I have observed that in known forms of ball valves a certain amount of plastic deformation and wear of the seat or seats takes place, whether they be made of plastic or metal, and that leakage then takes place, making a compensating adjustment desirable. Such adjustment may have to be made from time to time, particularly if the valve has just been installed and the valve elements are made of plastic, as may be the case at the present time. Preferably, it should be possible to make such adjustment without taking the valve apart or taking it out of the line of which it is a part. Heretofore, ball valves have been proposed which are adjustable without being taken out of the line, but at the expense that the adjusting means itself requires sealing to prevent valve leakage. The adjustment is apt to change the position of the valve with respect to the pipe to which it is connected and cause leakage, or in another form, the valve is so constructed that the valve seat adjustment may be changed by workmen unintentionally when working on the pipe line of which the ball valve forms a part.

It is important that the valve be capable of being opened or shut with the least possible effort. The valve embodying the present invention can be made with almost a line contact between the ball and seat or seats and therefore the unit pressure of the ball on the moveable seat can be made very high without requiring the use of undue force to turn the valve. This external adjustment not only allows low actuating torque, but also permits easy assembly and looser manufacturing tolerances. The construction makes possible easy adjustment from the outside to compensate for wear or plastic deformation. Adjustment of the valve can be made from the outside without disturbing the line connection.

Sealing of the adjusting member after each adjustment is not required and the adjusting member is not in a position where it is likely to be moved unintentionally, but is in the body and accessible only by means of an adjustable face spanner wrench, or other means of applying torque to the ring.

In the drawings, FIG. 1 is a longitudinal sectional view of a valve embodying the present invention.

Figure 1:
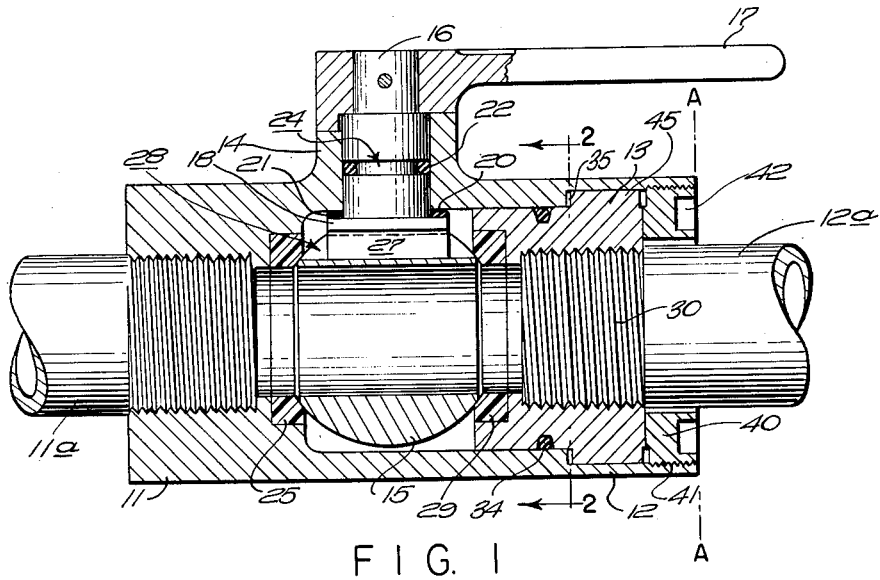

Having reference to the illustration in FIGURE 1, an improved valve is seen to include a single-piece body having a screw threaded end portion 11 internally threaded for connection to the pipe 11a and an opposite end portion 12 accommodating a bushing 13 which is internally threaded for connection to the pipe 12a. At 14 is indicated an integral projection for the valve stem, at 15 the centrally apertured ball, at 16 the stem, and at 17 the handle pinned to the stem. The stem 16 has a circular flange 18 and below it a transverse key 27 which slides into a slot 28 in the top of the ball 15 so that the stem 16 and then the ball 15, may be assembled within the single-piece body and the ball may thereafter be moved lengthwise in the body for adjustment purposes without cramping the stem.

The flange 18 is larger than the stem so that the upward thrust due to internal pressure within the valve body is resisted by the shoulder 20 on the valve body. Leakage and wear at this point is prevented by an elastomer thrust washer 21. This thrust washer deforms so as to allow assembly without machining of the shoulder on either the stem or body. Leakage around the stem is prevented by a packing 22, preferably of the well-known "O-ring" type, located in a groove 24 in the valve stem 16.

Figure 2:
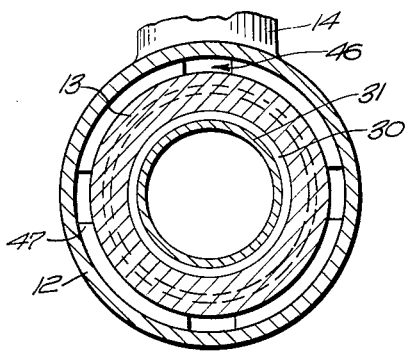
FIG. 2 is transverse cross-sectioned view of a portion of the valve assembly taken along section line 2—2 in FIG. 1.
Figure 3:
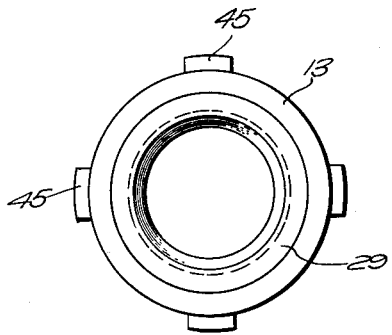
FIG. 3 is an end view of an internal valve bushing which forms part of an improved adjustable seat assembly.
Figure 4:
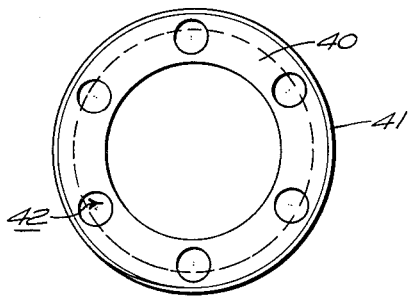
FIG. 4 is an end view of a special adjusting collar employed in the improved valve together with a connecting pipe.

At 25 is shown a valve packing or seat which may be of metal or of other suitable material, for instance, the plastic known as Teflon. This valve packing is located in a groove in the valve body. The valve packing is shaped to make a contact approaching a line contact with the globular surface of the ball 15. An opposing packing ring 29 is carried in a suitable groove in the bushing 13 which is enclosed and slidable in the end portion 12 of the valve body. This bushing 13 is screw-threaded, as shown at 30, with the pipe 12a. The bushing 13 is slidable toward and away from the ball 15, and enclosed between the bushing and the interior of the body is an O-ring 34 which is partially trapped in an annular groove around the bushing, leakage by the bushing being prevented by this or other convenient sealing means. The outer end of the bushing 13 is provided with one or more ribs 45 (see FIG. 3) which slide in grooves 46 in the inside of the valve body (see FIG. 2), and these ribs provide shoulders 35, which prevent the bushing being moved toward the ball 15 for more than a predetermined distance.

Therefore, the bushing 13 is slidable toward or away from the ball 15 for adjustment of the pressure of the plastic packing rings 25 and 29 on the ball and to compensate for plastic deformation of the packing rings, but cannot rotate when the pipe 31 is screwed into the valve body and will not permit the seat to be damaged by jamming against the ball.

At 40 there is shown an adjusting collar which is screwed into the open end of the tubular end-portion 12 of the body, the screw threads being indicated at 41. The outer end of the adjusting collar 40 is provided with wrench-engagement holes 42 for receiving lugs of a face spanner, wrench, a drift pin, or the like. Also the adjusting collar 40 does not require sealing with the valve body since it is outside of the bushing 13 which is itself sealed to the body by the O-ring 34 or other sealing means. The valve body end 12 extends approximately to the outer end of the collar so that when the adjustment collar 40 is in place, its outer end surface need not protrude beyond the plane A—A of the end face of end portion of the body. If it does protrude slightly, only the threaded cylindrical exterior of the collar is exposed and therefore, the collar is not easily disturbed and is not accessible except by the above described wrench which can extend around its outer end. Screwing the adjusting collar inward pushes the bushing 13 inward and consequently increases the pressure of the packing ring 29 on the ball 15. This pressure in turn pushes the ball 15 against the opposite packing ring 25 but does not tend to cramp or bend its stem 16 since the ball 15 slides on the rib 27.

It will be observed that the hole in the adjusting collar 40 is larger than the diameter of the pipe 12a, and therefore, threading of the pipe into or out of engagement with the bushing does not disturb the position of the adjusting collar controlling the pressure of the packing ring on the ball 15.

What I claim as new and desire to secure by Letters Patent of the United States is:

A ball valve having seat seals adjustable while the valve is connected in a pipe line, comprising:

(a) a valve body having a flow passageway therethrough and threaded on the interior at one end of said passageway for connection of the body to an externally-threaded pipe;

(b) a ball-shaped valve member having a flow opening therethrough and mounted within the valve body for rotation adjustably about an axis to control flow through the valve;

(c) a seal ring within the valve body surrounding said flow passageway near said one end thereof and forming a seat for said ball-shaped member;

(d) a movable tubular bushing recessed wholly within the valve body at the opposite end of said passageway and slidable within the valve body radially in relation to said ball-shaped member;

(e) a seal ring mounted on the inner end of said tubular bushing adjacent said ball-shaped member and forming a seat therefor;

(f) said tubular bushing having a substantially cylindrical exterior surface, and said valve body having a substantially cylindrical interior surface at said opposite end of said passageway complementing the exterior surface of said bushing, whereby a close fit is produced between said bushing and valve body and said bushing is slidable within said valve body;

(g) an O-ring seal between the slidable tubular bushing and valve body at said opposite end of said passageway;

(h) means keying said bushing angularly in relation to said valve body while permitting sliding movement of said bushing in said valve body;

(i) said tubular bushing being internally threaded for connection to an externally-threaded pipe of predetermined outer diameter;

(j) said valve body being internally threaded at said opposite end of said passageway for a predetermined distance outermore in relation to said bushing and said substantially cylindrical interior surface of said body; and (k) an externally-threaded annular adjustment collar shorter than said predetermined distance threaded into the internally-threaded valve body at said opposite end and having an inner diameter greater than the diameter of the internal threading of the bushing, whereby said adjustment collar is recessed wholly within the valve body at said opposite end and cannot contact a pipe connected with said bushing;

(l) said adjustment collar having its inner end face in engagement with the outer end face of said bushing and having surfaces on its outer end face for engagement with a spanner tool, whereby adjustments of said recessed collar and said bushing can be changed only by a spanner tool.

References Cited in the file of this patent
UNITED STATES PATENTS

| | | |
|---|---|---|
| 2,283,985 | Grant | May 26, 1942 |
| 2,475,702 | Funke | July 12, 1949 |
| 2,578,396 | Brown | Dec. 11, 1951 |
| 2,839,266 | Kaiser | June 17, 1958 |

FOREIGN PATENTS

| | | |
|---|---|---|
| 676,093 | France | Nov. 18, 1929 |
| 1,220,081 | France | Jan. 4, 1960 |